March 31, 1964 R. E. GOULD ETAL 3,127,498
FLASH ELECTRIC SURFACE ELEMENT CONTROL
Filed Feb. 27, 1961 2 Sheets-Sheet 1

INVENTORS
Richard E. Gould
James W. Jacobs
BY Frederick M. Ritchie
THEIR ATTORNEY March 31, 1964 R. E. GOULD ETAL 3,127,498
FLASH ELECTRIC SURFACE ELEMENT CONTROL
Filed Feb. 27, 1961 2 Sheets-Sheet 2

INVENTORS
Richard E. Gould
James W. Jacobs
BY Frederick M. Ritchie
THEIR ATTORNEY

United States Patent Office 3,127,498
Patented Mar. 31, 1964

3,127,498
FLASH ELECTRIC SURFACE ELEMENT CONTROL
Richard E. Gould and James W. Jacobs, Dayton, Ohio,
assignors to General Motors Corporation, Detroit,
Mich., a corporation of Delaware
Filed Feb. 27, 1961, Ser. No. 91,891
6 Claims. (Cl. 219—20)

This invention relates to a domestic appliance and more particularly to an improved control for a surface heating element.

Surface heating elements for an electric range may include means for boosting the power input to the heating element in order to quickly preheat the unit. Such a power booster arrangement is called a flasher system and is effected by temporarily connecting a normally 118 volt-unit across a 236-volt power supply so that additional wattage is supplied for the initial flash heating period. At the conclusion of such a flash period, there is a delay while the switch elements cool off to the point where the heating element is reconnected for normal operation on a 118-volt power supply. This delay is of little consequence where large quantities of food or liquid are being heated. However, where small amounts of liquid, such as water for instant coffee, are being heated, this delay is undesirable. Accordingly, it is an object of this invention to eliminate the delay between flash and normal operation in a surface heating element.

Another object of this invention is the provision in a flash heat surface element control of means to effect a timed operation of the element at low voltage in addition to a timed operation of the element at high voltage.

A more general object of this invention is the provision of a flash heat control for a surface heating unit which effects successive periods of flashing.

It is also an object of this invention to provide a flash heat control for a surface heating element which maintains the element energized continuously.

Further objects and advantages of the present invention will be apparent from the following description, reference being had to the accompanying drawings wherein preferred embodiments of the present invention are clearly shown.

Figure 1:
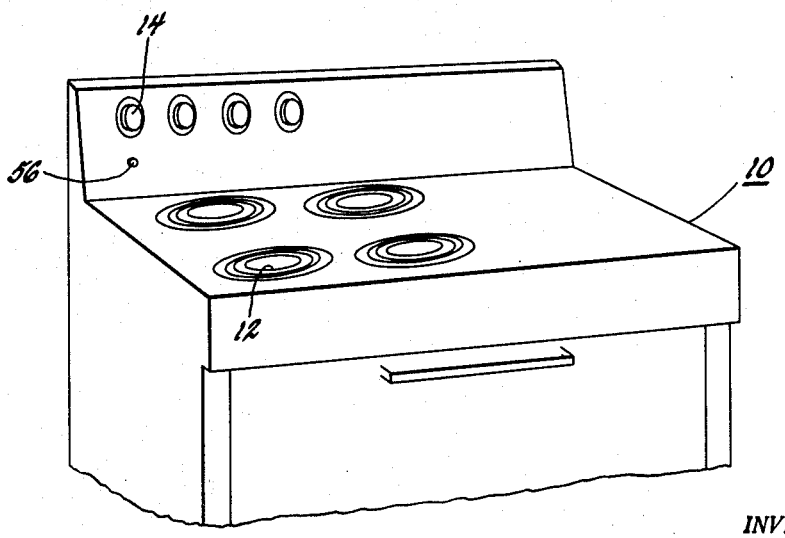
FIGURE 1 is a fragmentary perspective view of an electric range suitable for use with this invention.

In accordance with this invention and with reference to FIGURE 1, an electric range 10 is illustrated. The range 10 is provided with a plurality of cooking units, at least one of which is a flasher-type cooking unit or heating element 12, controlled by a control knob 14 on the console of the range. It should be understood that the remaining three surface cooking units could also be provided with the flasher fast heat system of this invention. In certain cooking operations it is desirable to get the heating element 12 up to temperature as quickly as possible. The prior art has taught means for flashing a normally 118-volt heating element or cooking unit for a brief period at 236 volts to accelerate the heat output of the unit. But such a system has a characteristic delay at the conclusion of flash whereby the heating element is completely deenergized for a brief time while the thermally responsive components thereof establish connection for normal operation. This inherent cool-off sag-off period after flash has tended to make such elements ineffective when it is desired to heat quickly small amounts of liquid.

Figure 2:
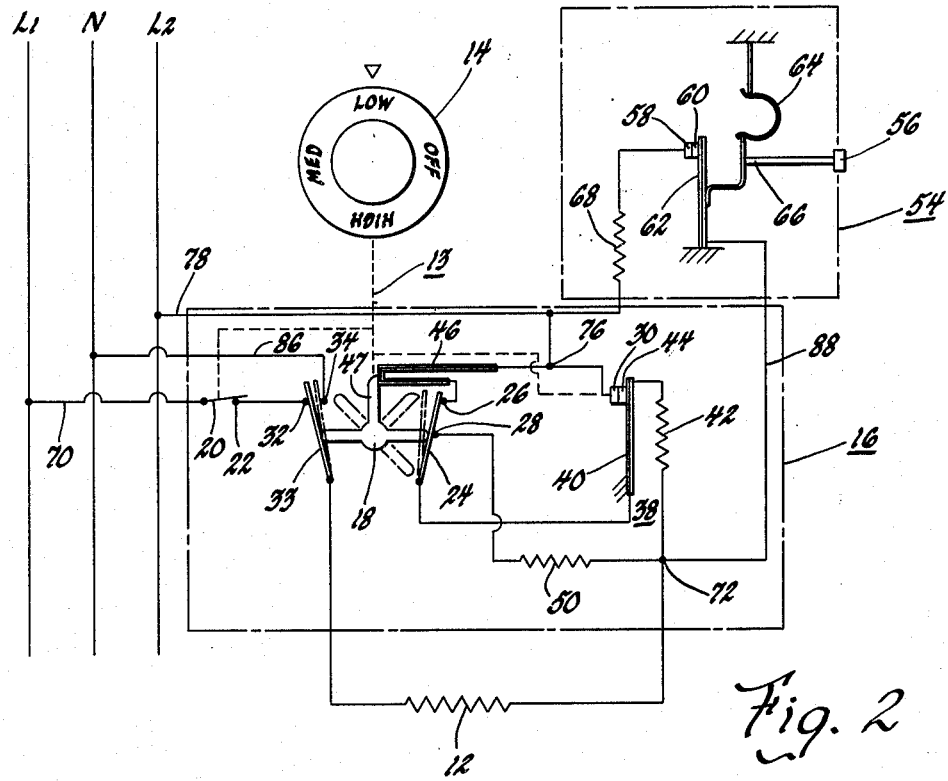
FIGURE 2 is a schematic wiring diagram of this invention.

An improved flashing control system is illustrated in FIGURE 2 wherein the surface heating element 12 during operation is continuously supplied from a domestic power source $L_1$, $L_2$ and a neutral N. For the purposes of this disclosure, the surface cooking element 12 may be a 1250-watt, 118-volt, 6-inch radiantube unit which is controlled by a primary flasher unit, shown generally at 16, to provide extremely fast initial heating. A flasher heat switch 13 automatically connects the surface heating element 12 to a 236-volt current supply, input of 5000 watts, for the initial heating period which is determined by the heat setting indicated on the switch control knob 14. Generally, the unit is flashed as the switch knob is turned from the Off position to any On setting, but at the end of the flash time, contacts within the switch automatically restore the unit to 118-volt operation for the remainder of the cooking period. The length of the flash times vary with the various settings on the control knob 14. For instance, the primary flash period when the knob 14 is set for High is thirty-one seconds: when set for Medium, the flash time would be around twenty-six seconds; and when set for Low, about seventeen seconds. It is, of course, within the purview of this invention to provide as many heat positions on the control knob 14 as is desired—those shown being merely to illustrate the operation of this invention.

The primary flash unit 16 is comprised of the control switch 13 having a knob 14 which is manually operable to rotate a latch member 18. The rotation of the user's knob 14 permits selection of the desired average watts input to the surface unit 12 for infinite heat control during normal operation. In addition to the latch 18, the control dial or knob 14 is connected mechanically to three internal cams (not shown) which also respond to the user's heat selection. One of these three cams is used to operate a line switch 20 opened and closed on a main line contact 22. Another of these three internal cams is used to hold a switch blade 24 closed on flash heat contacts 26 and 28 during the High setting only so that the surface heating element 12 is energized continuously on 118 volts. Lastly, another of the internal cams applies the necessary mechanical pressure to the cycler contacts 30 and 44 in order to regulate the length of time in each cycle that the surface unit 12 is energized and, in the Off position, completes a reset of the latch 18 to condition the primary flash unit 16 for the next flash heating period.

Further, the initial flash unit 16 includes a set of transfer contacts 32, 34 to change the surface unit voltage from 236 volts to 118 volts after the initial flash period. In order to provide for infinite heat control, the primary flash unit 16 includes a cycler 38 which consists of a bimetal cycling unit 40, a strip heater 42 and a cycling contact 44.

The initial or primary flash period is terminated by a latch bimetal 46 which warps upwardly or in a clockwise direction, as viewed in FIGURE 2, to disengage the latch arm 47 and release the spring-biased latch 18 for movement in a clockwise direction. The latch bimetal 46 is heated by the passage of current which, in all settings except High, mechanically permits contacts 32, 28 and 26 to terminate the 236-volt primary flashing period.

The primary flash unit 16 also includes a strip resistor 50 which diverts a portion of the current at certain times, from the cycler strip heater 42. This is necessary to reduce heat storage in the cycler assembly 38 so that it will start a normal cycling operation as promptly as possible. However, it is the delay attending the return of the cycling contact 44 to the cycling contact 30 which affords a period of time in which the surface unit 12 is completely deenergized. This interval of deenergization slows the rate at which a small load is brought up to temperature and creates a problem which the instant invention is designed to solve.

For the purposes of this invention, the control for the surface element 12 includes a secondary flash unit, shown generally at 54, and is provided with an actuator button 56 which may be pushed inwardly in order to secure the benefits of a secondary flash operation. The surface cooking unit 12 is maintained on the line continuously throughout a first or primary flash period in which the primary control unit 16 is effective and throughout a secondary flash period in which the secondary control unit 54 is effective for flash termination. More particularly, the secondary flash unit 54 includes a fixed secondary cycling contact 58 and a movable secondary cycling contact 60 carried on a secondary bimetal cycler unit 62. An over-center spring 64 is selectively engaged by a stem 66 on the push button 56 to force the contacts 58 and 60 into engagement. The cycler bimetal strip 62 is also provided with a strip heater 68 which is effective to heat the bimetal 62 and to open the contacts 58 and 60 at a predetermined time to terminate the secondary flash period—the opening being a snap-acting one through the efforts of the over-center spring 64.

The operation of this invention will now be described, starting first with the operation of the primary flash control unit 16. As the knob 14 is rotated from the Off position to the Low position, for instance, the line switch 20 will be closed on the contact 22 by any one of the internal cam arrangements. As the latch 18 is rotated until latch arm 47 engages the latch bimetal 46, the contact 30 will be biased rightwardly into selective pressure engagement with the cycling contact 44. The flash heating operation starts immediately at 236 volts. The current flows from $L_1$ through conductor 70, main line switch 20, main line contact 22, the 236-volt contact 32, the transfer switch blade 33, the surface heating element 12 to a first junction point 72 from which two parallel paths exist to the other side of the line $L_2$. One parallel path is from the junction 72 through the strip resistor 50, the strip resistor contact 28, the cycler bimetal 40 and the cycling contacts 30, 44 to a second junction point 76. The other parallel path is through the cycler strip heater 42, and the cycling contacts 30, 44 to the junction 76. From the junction 76, the current supply is completed to $L_2$ through a conductor 78. It should be noted that the current flow through the closed contact 26 and the latch bimetal 46 is insignificant at this time.

After a time interval, the cycler bimetal 40 warps to open the contacts 30 and 44 to end the initial part of the primary flash period. As an example, the interval of this initial part is about twenty-six seconds for High setting. At other settings, the timing is reduced proportionally, for instance, approximately fifteen seconds for the Low heat setting illustrated in FIGURE 2. When the cycling contacts 30 and 44 are opened for the first time, two parallel circuits permit 236-volt current to pass through the contacts 26 and 28 to the latch bimetal 46 and the terminal $L_2$. The first of these parallel circuits is from the junction point 72 through the strip resistor 50 to the contact 28. The other parallel circuit is from the junction 72 through the strip heater 42, the bimetal cycler 40 to the contact 28. Thus, it can be seen that all of the current is passing through the latch bimetal 46. In approximately five seconds, the heated latch bimetal warps upwardly to release the latch 18 for clockwise pivotal movement. This permits the switch blade 24 to open the contacts 26 and 28. At the same time, the clockwise rotation of the latch 18 will release the transfer switch blade 33 so that it may move from the 236-volt contact 32 to the 118-volt contact 34. Thus, 118-volt operation is then prescribed for the surface heating element 12. It is at this point that the secondary flash operation of this invention comes into play, as will be described more fully next following.

A considerable amount of heat is generated during the first two phases of the 236-volt primary flash period. First, the heat during the time that current is passing through the bimetal cycler 40 and its strip heater 42 and, secondly, the time when all of the heat passes through the latch bimetal 46. In the prior art devices heat generated during this time tended to prevent the start of the normal temperature controlled cycling operation of contacts 30 and 44.

Figure 3:
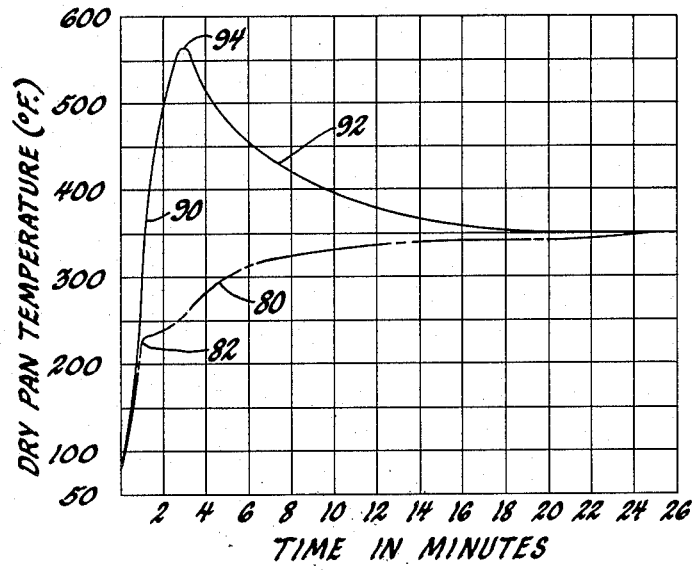
FIGURE 3 is a graphic illustration of the effectiveness of this invention in providing for faster heat output at the heating element during the start of a cooking operation.

With reference to FIGURE 3 wherein a curve 80 is used to illustrate for a prior art device the temperature of a dry pan setting on the surface unit 12 versus time, it may be seen that the primary flash period terminates approximately at a point 82 on the curve. Note that a sag-off forms in the curve 80 during which time dry pan temperature fails to rise at the same rate. Thus, the heat output of the surface heating element 12 is slowed during this time until the cycling contacts 30 and 44 again close to regulate the heat output of the heating element in accordance with the predetermined setting on the knob 14.

To overcome this drop in rate of temperature increase illustrated by the curve 80, a second phase of flash heating is provided by the secondary flash cycler 54. If an extended period of continuous energization at low voltage is desired after the primary high voltage flash period, the push button 56 is actuated so that the bimetal 62 will be snapped by the over-center spring 64 into engagement with the contact 58. During the primary 236-volt flash period, power passes also through the secondary flash unit 54. The parallel relationship of the two bimetal heaters 42 and 68 will cause the cycler contacts 30, 44 in the primary flash unit to remain closed longer, i.e., a longer first cycle on 236 volts, than would occur normally with the single stage flashing effected through the flash unit 16 alone. However, when the primary flash unit 16 is conditioned so that the latch bimetal 46 has flexed or warped upwardly to close 118-volt contact 34 and to open the contacts 26 and 28 (dotted line position in FIGURE 2) and the cycler contacts 30 and 44 have not yet closed due to the residual heat within the unit, 118-volt power will flow through the secondary flash unit as follows: from the neutral (N) through a conductor 86, the 118-volt transfer contact 34, the transfer switch blade 33, the surface heating element 12, the junction 72, conductor 88, secondary bimetal cycler 62, secondary cycling contacts 58 and 60, the secondary bimetal strip heater 68, conductor 78 to the other side of the line $L_2$. Thus, instead of the rate of temperature increase dropping off, as shown at 82 in FIGURE 3, the temperature of a dry pan on the surface heating element 12 will continue to rise along a curve portion 90 illustrated in the curve 92 for the flash heating system of this invention. It may be seen in FIGURE 3 that dry pan temperature will continue to rise to a point 94 at which approximately 560° F. is reached before the temperature starts falling off to the desired setting.

Figure 4:
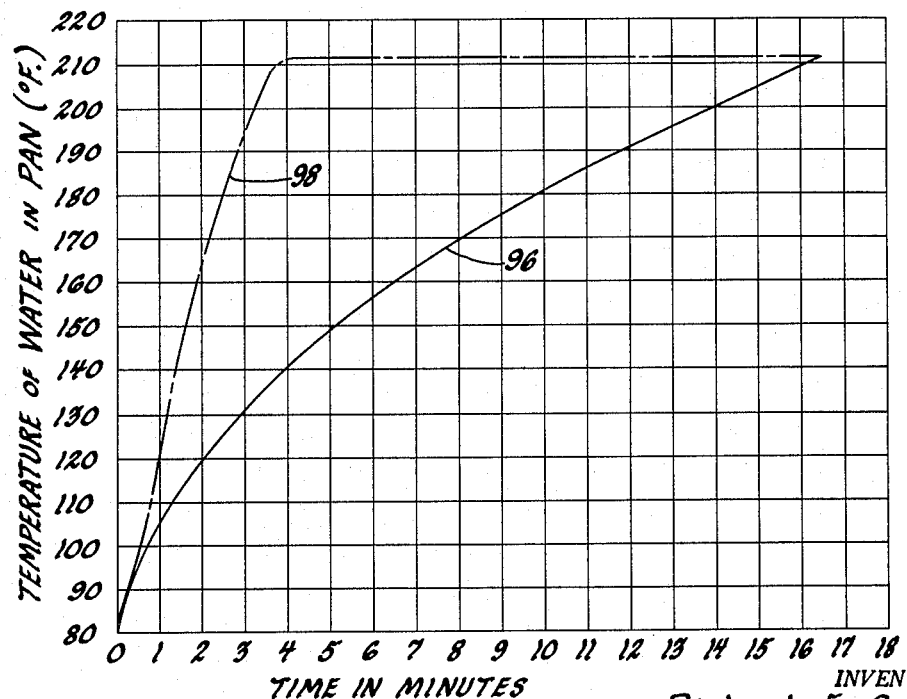
FIG. 4 is a graphic illustration of the improved speed with which the flash system of this invention quickly heats a small load.

Turning now to FIGURE 4 which represents the temperature versus time condition of a pan containing one pint of water on a heating element energized for Low heat, the advantages of this invention are made more apparent. The curve of a prior art single flash system wherein a deenergized period follows the opening of the flash contacts is shown in a curve 96. At the same time, a curve 98 exemplifies improved characteristics for the novel two-period flash system of this invention. Note on the prior art curve 96 that the small load of water is brought to the boiling point in approximately sixteen and one-half minutes. On the other hand, curve 98 illustrates that the timed 236-volt plus timed 118-volt dual flash system, wherein the surface heating element 12 is energized continuously, causes the water to attain its boiling point in approximately four minutes. This points up that small loads are more quickly brought to a desired temperature with the two-period flash system of this invention.

At the conclusion of the secondary flash period, the secondary bimetal 62 will warp rightwardly and the over-center spring 64 will provide a snap-acting opening of the contacts 58 and 60. When this occurs, the surface heating element 12 is returned to infinite heat control by the primary temperature control unit 16. More particularly, the cycling contacts 30 and 44 will open and close to maintain the manually preset power input to the heating element.

At High setting, as aforesaid, switch 24 will be held closed on contacts 26 and 28 by a cam (not shown). As a result, the surface unit 12 will operate continuously from the primary flash to the normal 118-volt operation. At settings other than High, contacts 26 and 28 are not held shut and will be opened in accordance with the position of the latch 18. In other words, contacts 26 and 28, in all dial settings except High, will be opened when the latch bimetal 46 warps upwardly and will remain open for the balance of the cooking period. Simultaneously with the opening of the contacts 26 and 28, the transfer switch blade 33 will be moved to 118-volt contact 34 so that the major portion of the cooking period will be done with the surface heating element 12 energized for 118-volt operation. In all settings other than High the bimetal cycler 38 will operate in the usual manner as an infinite heat control.

When the user turns the control dial 14 to Off, a cam (not shown) resets the latch 18 ready for the next flash operation.

It should now be seen that an improved flash system has been devised wherein the surface heating element 12 is energized continuously throughout a primary and a secondary flash period. This affords a more rapid heat up for small loads by preventing a temperature sag-off when the primary flash period terminates.

While the embodiments of the present invention as herein disclosed, constitute preferred forms, it is to be understood that other forms might be adopted.

What is claimed is as follows:

1. In a system for effecting first and second periods of overenergization and subsequent normal operation of an electrical heating unit, a primary overenergization control, said primary control including switch means and connections to effect overenergization or normal operation of said unit according to the position of said switch means, manually-controllable means for initiating said first period of overenergization of said unit through the medium of said switch means and connections, a first current-operable thermally responsive switch in circuit with said unit for timing the first period of overenergization and for controlling the normal energization of said unit, means including a current-operable latch element for effecting operation of said switch means from the first overenergization position to the normal operation position upon energization of said element, and a control switch closed by said manually controllable means for connecting said latch element in parallel with the contacts of said first thermally responsive switch for control by the latter, and a secondary overeneregization control selectively in circuit with said unit through said switch means only upon initiation of and during said first and second periods of overenergization of said unit, said secondary control including a second current-operable thermally responsive switch in circuit with said unit and in parallel with said first thermally responsive switch for timing the second period of overenergization after said switch means has been operated to said normal operation position.

2. In a system for effecting first and second periods of overenergization and subsequent normal operation of an electrical heating unit, a primary overenergization control, said primary control including switch means and connections to effect overenergization or normal operation of said unit according to the position of said switch means, manually-controllable means for initiating said first period of overenergization of said unit through the medium of said switch means and connections, a first current-operable thermally responsive switch in circuit with said unit for timing one portion of the first period of overenergization and for controlling the normal energization of said unit, means including a current-operable latch element for timing another portion of the first period of overenergization and for effecting operation of said switch means from the first overenergization position to the normal operation position upon energization of said element, and a control switch closed by said manually controllable means for connecting said latch element in parallel with the contacts of said first thermally responsive switch for control by the latter, and a secondary overenergization control selectively in circuit with said unit through said switch means only upon initiation of and during said first and second periods of overenergization of said unit, said secondary control including a second manually closable, current-openable switch in circuit with said unit and in parallel with said first thermally responsive switch and said latch element for timing the second period of overenergization after said switch means has been operated to said normal operation position.

3. In a system for effecting first and second periods of overenergization of an electrical heating unit, a primary overenergization control, said primary control including switch means and connections to effect overenergization of said unit, manually-controllable means for initiating said first period of overenergization of said unit through the medium of said switch means and connections, a first current-operable thermally responsive switch in circuit with said unit for timing the first period of overenergization of said unit, means including a current-operable latch element for effecting operation of said switch means to terminate the first period of overenergization and a control switch closed by said manually controllable means for connecting said latch element in parallel with the contacts of said first thermally responsive switch for control by the latter, and a secondary overenergization control selectively in circuit with said unit through said switch means only upon initiation of and during said first and second periods of overenergization of said unit, said secondary control including a second current-operable thermally responsive switch in circuit with said unit and in parallel with said first thermally responsive switch for timing the second period of overenergization after said switch means has been operated to terminate the first overenergization period.

4. In a system for effecting first and second periods of overenergization of an electrical heating unit, a primary overenergization control, said primary control including switch means and connections to effect overenergization of said unit, controllable means for initiating said first period of overenergization of said unit through the medium of said switch means and connections, a first thermally responsive switch in circuit with said unit for timing the first period of overenergization of said unit, means including a current-operable latch element for effecting operation of said switch means to terminate the first period of overenergization, and a control switch closed by said controllable means for connecting said latch element in parallel with the contacts of said first thermally responsive switch for control by the latter, and a secondary overenergization control selectively in circuit with said unit through said switch means only upon initiation of and during said first and second periods of overenergization of said unit, said secondary control including a second thermally responsive switch in circuit with said unit and in parallel with said first thermally responsive switch for timing the second period of overenergization after said switch means has been operated to terminate the first overenergization period.

5. In a system for effecting relatively short first and second periods of continuous overenergization of a cooking utensil supporting electrical heating unit in a high or low voltage circuit and a relatively long period of controlled intermittent energization of said heating unit, switch means for selectively connecting said unit into said high or low voltage circuit, primary means in series with said switch means in the high voltage connection for continuously overenergizing said unit on high voltage during said first period of overenergization and operative to actuate said switch means to the low voltage connection at the termination of said first period of overenergization, and secondary means in parallel with said primary means and in series with said switch means in said low voltage connection for continuously overenergizing said unit on low voltage positively without delay immediately following said first period of overenergization and during said second period of overenergization, at least a portion of said primary means being effective at the termination of said second period of overenergization for controlling the energization of said heating unit during said third period of controlled intermittent energization.

6. In a system for effecting relatively short first and second periods of continuous overenergization of an electrical heating unit in a first or second voltage circuit and a relatively long third period of controlled intermittent energization of said heating unit, switch means for selectively connecting said unit into said voltage circuit, primary means in series with said switch means in said first voltage connection for continuously overenergizing said unit on first voltage during said first period of overenergization and operative to actuate said switch means to said second voltage connection at the termination of said first period of overenergization, and secondary means in parallel with said primary means and in series with said switch means in said second voltage connection for continuously overenergizing said unit on second voltage without delay immediately following said first period of overenergization and during said second period of overenergization, at least a portion of said primary means being effective at the termination of said second period of overenergization for controlling the energization of said heating unit during said third period of controlled intermittent energization.

References Cited in the file of this patent

UNITED STATES PATENTS

| | | |
|---|---|---|
| 2,435,530 | Candor | Feb. 3, 1948 |
| 2,685,636 | Vogelsberg | Aug. 3, 1954 |
| 2,798,929 | Wojcik | July 9, 1957 |
| 2,815,428 | Pearce | Dec. 3, 1957 |
| 2,828,399 | Fry | Mar. 25, 1958 |